(No Model.) 2 Sheets—Sheet 1.

R. S. PEASE.
APPARATUS FOR MOLDING GLASS, METAL, &c.

No. 487,426. Patented Dec. 6, 1892.

Witnesses:
James F. Duhamel.
Horace A. Dodge.

ROGER S. PEASE, Inventor,
by Dodge & Sons,
Attys.

(No Model.) 2 Sheets—Sheet 2.

R. S. PEASE.
APPARATUS FOR MOLDING GLASS, METAL, &c.

No. 487,426. Patented Dec. 6, 1892.

Witnesses:
James F. Duhamel.
Horace A. Dodge.

ROGER S. PEASE,
Inventor,
by Dodge & Son,
Attys

UNITED STATES PATENT OFFICE.

ROGER S. PEASE, OF ROSE, MINNESOTA.

APPARATUS FOR MOLDING GLASS, METAL, &c.

SPECIFICATION forming part of Letters Patent No. 487,426, dated December 6, 1892.

Application filed July 25, 1892. Serial No. 441,189. (No model.)

*To all whom it may concern:*

Be it known that I, ROGER S. PEASE, a citizen of the United States, residing at Rose, in the county of Ramsey, and State of Minnesota, but having my place of business at Minneapolis, Minnesota, have invented certain new and useful Improvements in Apparatus for Molding Glass, Metal, &c., of which the following is a specification.

My invention consists in a novel apparatus for handling or working molten substances, such as metals and glass, whereby I am enabled to separate the purest and most fluid portion of the material from the less pure portion, and to deliver the same from the melting or containing tank or vessel without forming holes through the walls or bottom thereof, and without tipping the same.

The invention is applicable generally to metal casting or founding, to glass manufacture, and to like purposes, and possesses peculiar advantages in connection with glass working, as hereinafter explained.

Figure 1:
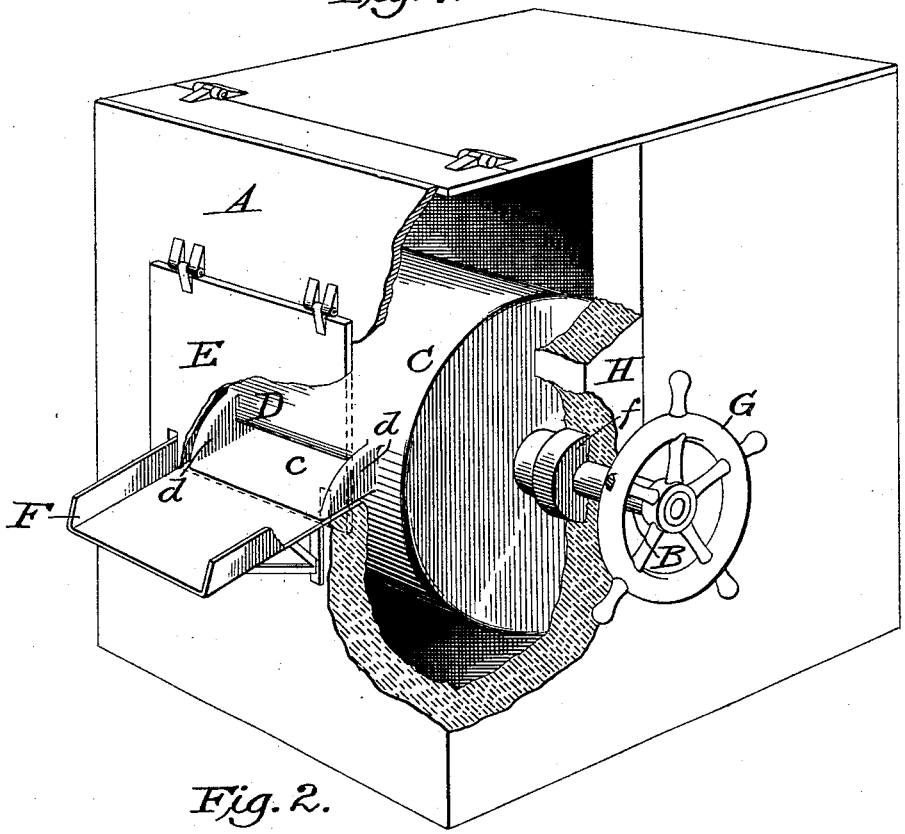
Figure 2:
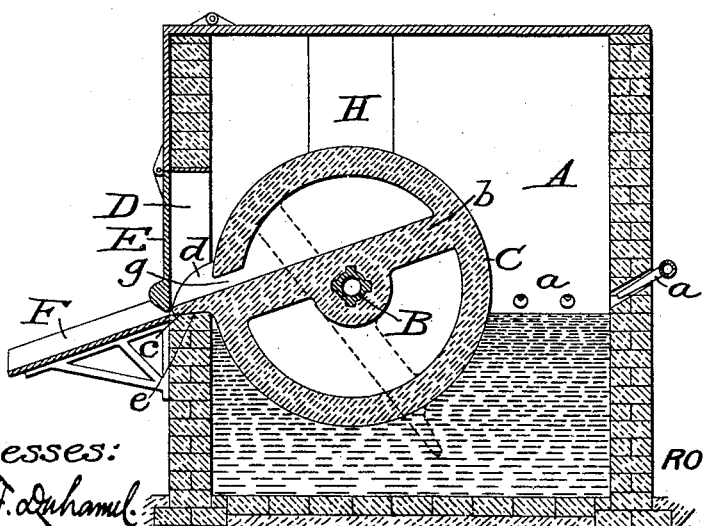
Figure 3:
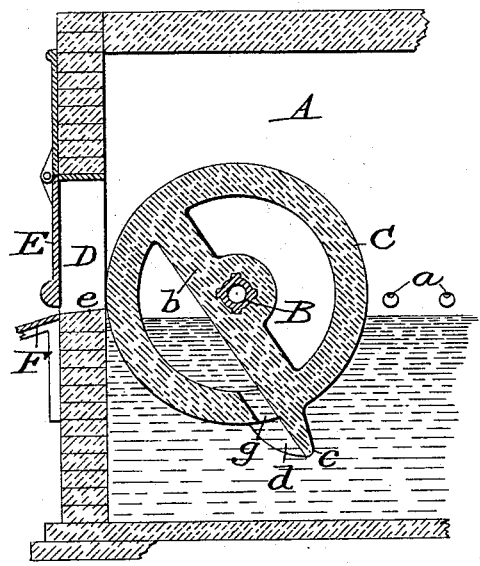
Figure 4:
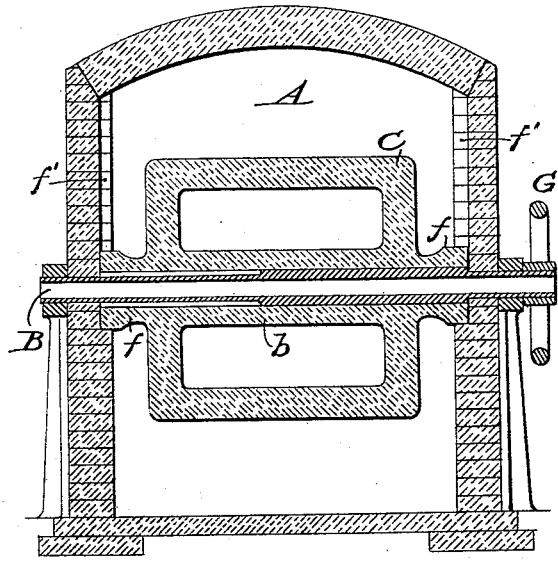
Figure 5:
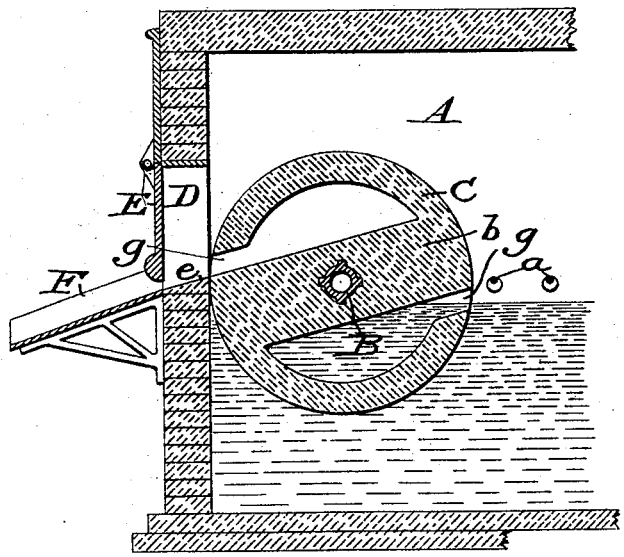

In the accompanying drawings, Figure 1 is a perspective view of a simple form of apparatus embodying my invention, parts being broken away to show the interior construction; Figs. 2 and 3 are vertical sectional views, at right angles to the axis of the pouring drum or shell; Fig. 4, a vertical sectional view on the line of the axis of said drum; Fig. 5, a sectional view illustrating a modified form of drum.

It is well known that in metal founding, glass making, and like operations, dross and impurities rise to the top of the molten mass, while the purest and most fluid portion settles to the bottom of the melting or containing vessel. To secure this desirable pure portion it becomes necessary either to skim off the dross, or to draw off the purer portion through openings at or near the bottom of the vessel or tank. In the case of metals it is feasible to draw the molten material from the bottom of the receptacle, though difficulty is experienced in preserving the walls of the opening and in effectively sealing said opening. With molten glass, however, it is found that the glass combines chemically with the material constituting the linings or walls of outlet openings, and passages, and causes a rapid wearing away and change of form. For this reason the plan of drawing off the molten glass through a hole or opening at or near the bottom of the receptacle is rarely attempted in practice, though frequently proposed in patents and publications, and resort is had to ladling, to tipping the entire tank or receptacle, or to like means for withdrawing the material from the receptacle. I obviate the difficulties heretofore encountered, and secure the very best of the material by means of the apparatus shown in the drawings, which receives its supply at a point beneath the surface of the mass, carries it upward, and discharges it clear of the mass, as will now be explained.

A indicates a chamber, which may be made of or lined with fire-brick or other refractory material of sufficient resisting capacity, which chamber is designed to contain the molten metal to be poured, whether the same be soft metal, hard metal, molten glass or other. This chamber A may constitute the melting chamber, in which case it may be built over or connected with a suitable furnace, or, as is preferred, it may be provided with burners or nozzles $a$ for the introduction of gas or vapor fuel in the manner now well understood in glass-making and iron and steel working.

Extending through the chamber A from side to side, and carried in suitable bearings on the portion outside of said chamber, is a shaft B, preferably made hollow for the passage through it of air, water or other cooling medium. This however, will not be necessary in all cases. The shaft B is preferably formed with one or more wings or ribs, as shown in Fig. 2, in order to make fast upon it and hold against independent rotation, the hollow shell or cylinder C, which constitutes the pouring vessel.

When intended only for soft metals and alloys, as lead, tin or spelter, pewter, type metal and the like, the vessel or cylinder C may be made of metal, and the journals or bearings made integral therewith instead of separate, as herein indicated, but the construction shown is that intended for metals and materials of higher fusion point, for which the cylinder or vessel C will need to be made of fire clay or other highly refractory material.

The vessel or cylinder C comprises, as shown in Figs. 1 and 2, a hollow or circular shell or drum with closed ends, the circumference of which is concentric with the shaft B, the walls of the shell being connected with the central portion (which latter surrounds and is made fast upon shaft B), by means of a diaphragm or partition b extending from end to end of the drum and carried outward at one side to produce the pouring lip c which is formed with side walls or flanges d to prevent the lateral escape of the material poured. The shell C is of such size, or its shaft B is located in such position with reference to the front wall of chamber A as to cause the lip c to rest upon the lower edge or wall e of an opening D made in the front wall of chamber A, as shown in Figs. 1 and 2. To prevent the escape of heat, the opening D is normally closed by the door E, hinged at its upper end and thereby caused to assume normally the position shown in Figs. 1 and 2. As the cylinder C is rotated, the edge c coming in contact with the door E, forces the same slightly outward until the lip passes below the horizontal plane of the axis of the cylinder, when the door again swings inward. Directly in front of the opening D, and mounted upon suitable supports, is a shelf or table F, over which the molten metal pours from cylinder C, and by contact with which it becomes sufficiently set to enable it to be drawn forward by tongs, rolls or other appliances, in the case of certain metals.

As shown in Fig. 1, the fire clay of the cylinder C is caused to encircle and surround the shaft B in the direction of the length of the latter, to points beyond the inner walls of the chamber A, or in other words, said shaft is provided with concentric coverings f of fire clay projecting into recesses in the walls of chamber A. These recesses are of such depth as to effectually prevent the passage of molten metal between their inner walls and the circumference of the coverings f in chamber A.

The shaft B is extended at one or both ends beyond the pillow-block or bearing in which it rests and turns, to receive a hand-wheel G, or other appliance for turning the cylinder. The space within the cylinder on the side of the diaphragm b opposite that at which the pouring-opening g is located, is advisably left closed, but it may in some cases be provided with openings either at its ends or through the circumference of the cylinder so as to permit the entrance of the molten material into the space. It is, however, preferred that it remain closed, for the reason that when this is done, the molten material in the chamber A tends to float the cylinder and relieve its bearings of the weight which would otherwise be put upon them. When used with molten substances of greater specific gravity than the material of which the cylinder is composed, it will be unnecessary to make the cylinder hollow, except on that side of the longitudinal wall or diaphragm on which the containing and pouring chamber is located, though it may be so made if preferred. As a consequence of this construction and arrangement, the cylinder may be turned with great ease and facility. Except when the pouring operation is to be performed, the cylinder may stand either in the position shown in Figs. 1 and 2, or in that shown in Fig. 4, but preparatory to pouring it is caused to assume the position shown in Fig. 3, so that the molten matter of chamber A may flow through the opening g into the space between the partition or diaphragm b and the wall of the cylinder. The cylinder being then rotated and gradually carried toward the position indicated in Figs. 1 and 2, the molten matter contained within said space is gradually lifted above the axis of the cylinder C, and as the lip c descends, the contents of the cylinder begin to pour over the same in a broad sheet the full width of said lip, and if the movement of the cylinder be properly timed or graduated, in a stream of uniform thickness. This stream falling upon the bed or table F, and becoming thereby partially set or hardened, forms a sheet of sufficient tenacity to be drawn forward over the bed or table F, whence it may be passed between rolls if desired, to give that uniformity of thickness which is now attainable only by a succession of rollings with intermediate heatings or annealings.

While it is practicable to use the invention in the manner above set forth, that is to say, for the direct production of sheets, it is manifest that the pouring vessel is susceptible of use for the pouring of all kinds of molten materials where it is desired to thus pour them without removing the cylinder from the chamber A, and the contents may pass directly into molds or be delivered upon molding tables, or to any point or receptacle desired, in which case the lip c may be of any desired form.

In order to facilitate the removal of the cylinder in case it is desired to take it from the chamber A for any reason, the walls of chamber A may be provided with removable filling pieces H, of a width equal to or slightly greater than the diameter of the coverings f of the shaft, so that upon removing or throwing back a section of the top of chamber A, and withdrawing the blocks H, the cylinder may be lifted out by any convenient hoisting mechanism.

If preferred, and where it is desired only to provide for renewing the cylinders in case of breakage, the walls of chamber A may simply be provided with vertical grooves or recesses f' of a width equal to the diameter of the projecting covers f, so that by first withdrawing the shaft B, the cylinder shall be made free to be lifted vertically from the chamber, a new one being lowered to its place, and the shaft B being inserted endwise through the wall. To prevent the molten metal from following along the surface of the portions f to the joint, it is advisable to curve said portions, as shown in Figs. 1 and 4.

In Fig. 5 the drum is represented as having two containing chambers, each furnished with its pouring opening. When thus constructed, the drum may be turned always in one direction and made to discharge practically without intermission for any desired length of time.

Of course the structure will be adapted to the nature of the materials to be melted,—both in design and material.

The lip c may be made to project abruptly from the circumference of the shell, or it may be given any desired curve or angle. When used it will, by forcing back the molten metal with which it first comes in contact, crowd away the dross and impurities floating on the top and enable the opening g to descend below the surface of the mass before the metal begins to flow into its interior.

By turning the cylinder back somewhat quickly its mouth will be carried below the surface of the fluid mass before the fluid can enter its interior, and being then allowed to come to rest it will fill, and can be turned forward to discharge. In this way the cylinder is with certainty charged with the pure fluid from below the surface.

Having thus described my invention, what I claim is:—

1. In combination with a receptacle to contain material in a fluid condition, a drum journaled in or above said receptacle and provided with a diaphragm or partition, and with an opening through its circumferential wall, substantially as described, whereby the drum is adapted to dip into the fluid material, receive a charge or supply thereof, carry the same above the axis of the drum, and discharge it, substantially as set forth.

2. In combination with chamber A, drum C provided with longitudinal diaphragm or wall b, opening g at one side of said diaphragm or wall, and pouring lip c in front of said opening, the drum being adapted to rock or turn substantially as described.

3. In combination with chamber A, drum C mounted within said chamber and provided with longitudinal wall or diaphragm b, circumferential opening g and lip c in front of said opening; and shaft B extending through said drum and serving to support the same and as an axle upon which it may turn.

4. The combination of chamber A provided with wall-opening D, shaft B extending through the said chamber, and drum C mounted upon said shaft, provided with longitudinal wall or partition b, circumferential opening g, and lip c in front of said opening, and adapted to rock or turn substantially as described.

5. In combination with chamber A, having recessed walls; shaft B extending through said chamber; and drum C mounted upon said shaft and having the portion f encircling the shaft B, and extending into the recesses of the walls,—said drum C and extensions f being made of refractory material and adapted to rock or turn substantially as described, and the drum being provided with an internal chamber and with a circumferential opening, g, into said chamber.

6. In combination with chamber A provided with opening D in its wall, door E covering said opening, and shelf or table F extending outward from the lower side of said opening; drum C, mounted and adapted to turn within the chamber A close to opening D, and provided with longitudinal wall or diaphragm b, circumferential opening g, and pouring lip c in front of the opening g, all substantially as set forth.

7. In combination with chamber A and pouring drum C having longitudinal wall or partition b and circumferential opening g, shaft B extending through the walls of the chamber and through the cylinder, and removable therefrom, whereby the shaft is adapted to be withdrawn longitudinally and the cylinder is thereby permitted to be removed from the chamber A.

8. In combination with a chamber to contain molten matter, a pouring drum mounted within said chamber and supported by axial journals, said drum being constructed with a diaphragm or partition and an opening through the wall of the drum into the space between the partition and the inner wall of the cylinder at one side of the diaphragm, the space on the opposite side thereof being closed, substantially as described, whereby the drum is adapted to be floated by the contents of the chamber and the bearings are relieved of pressure due to the weight of the cylinder and its contents.

In witness whereof I hereunto set my hand in the presence of two witnesses.

ROGER S. PEASE.

Witnesses:
HORACE A. DODGE,
WILLIAM W. DODGE.